US 6,731,956 B2

(12) United States Patent
Hanna et al.

(10) Patent No.: US 6,731,956 B2
(45) Date of Patent: May 4, 2004

(54) RETRACTABLE CORD FOR A MOBILE PHONE OR OTHER WIRELESS DEVICE

(76) Inventors: Tania W. Hanna, 8529 West Oak Pl., Vienna, VA (US) 22182; Christopher T. Long, 8529 West Oak Pl., Vienna, VA (US) 22182

( * ) Notice: Subject to any disclaimer, the term of this patent is extended or adjusted under 35 U.S.C. 154(b) by 231 days.

(21) Appl. No.: 09/816,417

(22) Filed: Mar. 26, 2001

(65) Prior Publication Data

US 2002/0137554 A1 Sep. 26, 2002

(51) Int. Cl.⁷ .................................................. H04M 1/00
(52) U.S. Cl. .................. 455/569.1; 455/575.2; 379/420.02; 379/420.04; 379/433.02
(58) Field of Search .................. 455/90, 575, 569, 455/346, 347, 348, 350; 379/420.02, 420.03, 420.04, 433.02, 433.03, 433.05, 388.02; 381/370, 384

(56) References Cited

U.S. PATENT DOCUMENTS

| 4,146,191 | A | 3/1979 | Cavanaugh | 242/107 |
|---|---|---|---|---|
| 4,646,987 | A | 3/1987 | Peterson | 242/107.11 |
| 5,094,396 | A | 3/1992 | Burke | 242/107.1 |
| 5,144,091 | A | 9/1992 | Martan et al. | 568/479 |
| 5,230,481 | A | 7/1993 | Wheeler et al. | 242/107.1 |
| 5,363,444 | A | 11/1994 | Norris | 379/430 |
| 5,511,120 | A | 4/1996 | Hirata et al. | 379/433 |
| 5,516,986 | A | 5/1996 | Peterson et al. | 174/113 |
| 5,710,812 | A | 1/1998 | Fogel | 379/438 |
| 5,724,667 | A | * | 3/1998 | Furuno | 455/575 |
| 5,832,098 | A | 11/1998 | Chen | |
| 5,938,137 | A | 8/1999 | Poulson | 242/379.2 |
| 6,019,304 | A | 2/2000 | Skowronski et al. | 242/373 |
| 6,065,080 | A | 5/2000 | Alpert | 710/102 |
| 6,088,021 | A | 7/2000 | Yong | 345/163 |
| 6,212,414 | B1 | 4/2001 | Alameh et al. | |
| 6,301,487 | B1 | * | 10/2001 | Nakamura | 455/550 |

FOREIGN PATENT DOCUMENTS

WO     WO 99/60764     11/1999

OTHER PUBLICATIONS

Motorola United States Consumer Catalog, Accessories, Retractable Hands–Free Headset—98196 (1 page).

* cited by examiner

Primary Examiner—Duc M. Nguyen
(74) Attorney, Agent, or Firm—Snell & Wilmer LLP

(57) ABSTRACT

A retractable cord for mobile phones or other wireless devices. The cord includes an ear piece having a speaker for delivering sound to a user and possibly having a microphone. The retractable cord can be contained within a separate unit with a connector for attachment to a connector on the mobile phone or other wireless device, such as a jack or other receptacle, or it can be contained internally within those devices. The cord can retract onto a spring-loaded spool, or via other retractable mechanisms, and be held at various extended positions with a stop mechanism that prevents retraction of the cord.

14 Claims, 5 Drawing Sheets

RETRACTABLE CORD FOR A MOBILE PHONE OR OTHER WIRELESS DEVICE

FIELD OF THE INVENTION

The present invention relates to a retractable cord for a mobile phone or other wireless device.

BACKGROUND OF THE INVENTION

FIG. 1 is a diagram of a conventional mobile phone 10 having a microphone 18 for converting a user's voice into electrical signals and a speaker 12 for converting electrical signals into sound for the user to hear. The user can enter phone numbers or other information using a key pad 16 and view information on a display panel 14. Conventional mobile phone 10 also has circuitry (not shown) to receive, transmit, and process electrical signals for wireless mobile phone communication. Mobile phones, commonly referred to as "cell phones," and their operation are well known in the art.

FIG. 2 is a diagram of a conventional cord 24 for mobile phone 10. Cord 24 has a connector 28, such as a phone-type plug, to be inserted into a corresponding connector, such as a jack or other receptacle, on mobile phone 10. Many mobile phones have such a connector as illustrated by a device connector 20 on a top 11 and a device connector 22 on a side 13 of mobile phone 10. Usually, a mobile phone has only one connector, and device connectors 20 and 22 are both shown to illustrate typical locations for the connectors.

When plugged into mobile phone 10, cord 24 permits a user to hear sound through a speaker in an ear piece 30 to be inserted into the user's ear in this example. A section 26 of the cord electrically connects speaker 30 with connector 28 and can include, for example, wires within a protective coating. Conventional cord 24 also typically includes a microphone in ear piece 30 for converting a user's voice into an electrical signal. Certain conventional cords 24 have the microphone separately attached to section 26, as represented by a microphone 25. The separate microphone 25 is located, for example, approximately twelve inches from ear piece 30 so that it is close to a user's mouth when ear piece 30 is inserted into the user's ear. Other types of separate microphones include boom microphones, and other types of ear pieces include headsets having a speaker for placement against or proximate a user's ear.

The insertion of cord 24 into device connectors 20 or 22 de-activates speaker 12 and microphone 18 and permits hands-free use of mobile phone 10. It also permits the user to locate mobile phone 10 away from his or her head and thus avoid or minimize potential adverse effects of electromagnetic energy from the phone's antenna.

Mobile phone 10, however, provides no convenient way to store cord 24. For example, a user may wrap cord 24 around mobile phone 10 when not in use, or the user may simply bunch up the cord apart from the mobile phone and place it in the user's pocket, purse, or briefcase. When stored in any of those ways, cord 24 can become tangled, making it difficult to quickly insert ear piece 30 into the user's ear in order to answer an incoming telephone call or to make an outgoing call. When stored apart from the mobile phone, cord 24 can become lost or not easily located for attachment to mobile phone 10 to answer or make a telephone call.

Accordingly, a need exists for a more convenient way to store and attach a cord for a mobile phone or other wireless device.

SUMMARY OF THE INVENTION

A mobile phone or other wireless device consistent with the present invention includes a retractable cord having an ear piece. A retractable mechanism in the mobile phone or other wireless device operates to permit extension of the cord from the mobile phone or other wireless device through an aperture and retract at least a portion of the cord into the mobile phone or other wireless device through the aperture.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

A cord consistent with the present invention is retractable, either in a separate unit or internally within a mobile phone or other wireless device. A user can easily extend the cord in order, for example, to insert an ear piece of the cord into the user's ear or place an ear piece against or proximate the user's ear for answering an incoming telephone call or making an outgoing call, or listening to music. After the call, the user can retract the cord in order to conveniently store it in the device or separate unit.

Retractable Cord Unit

Figure 1:
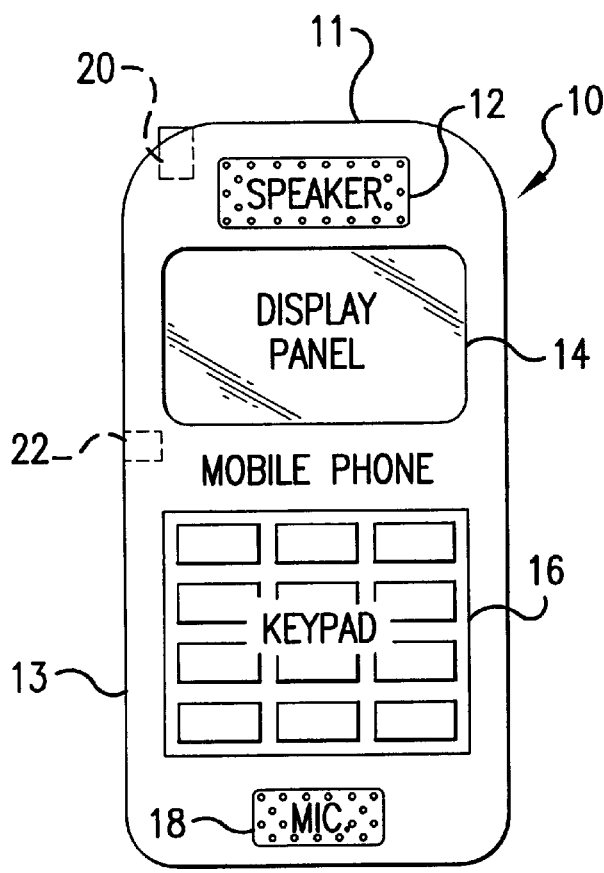
FIG. 1 is a diagram of a conventional mobile phone.
Figure 2:
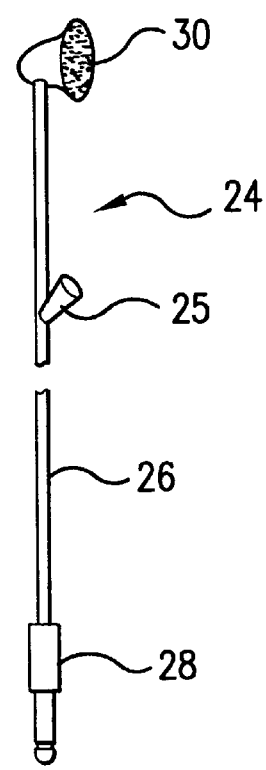
FIG. 2 is a diagram of a conventional cord for the mobile phone.
Figure 3:
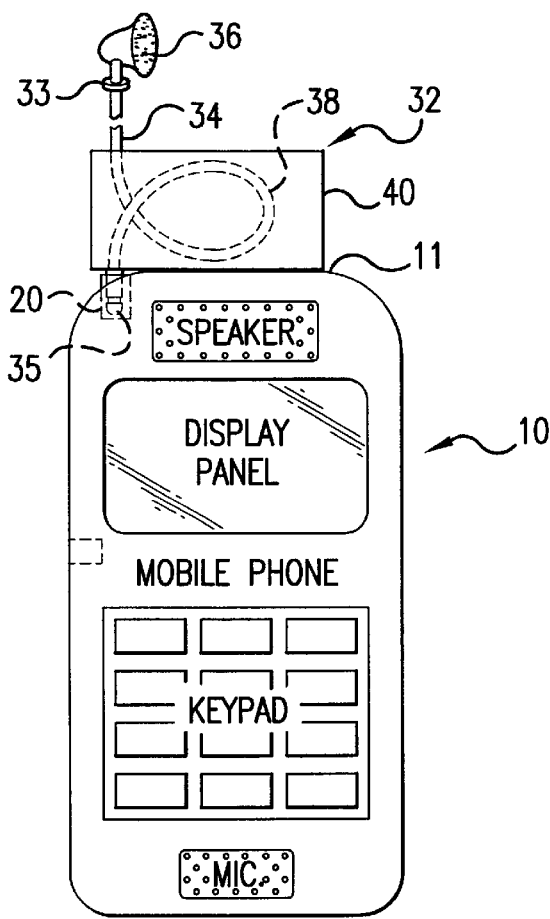
FIG. 3 is a diagram illustrating a separate retractable cord unit for a mobile phone in a first configuration.

FIG. 3 is a diagram illustrating a separate retractable cord unit 32 for mobile phone 10 in a first configuration. Unit 32 includes a housing 40 for containing a retractable mechanism to retract a cord 34, in this example a spring-loaded spool as represented by coil 38 and further explained below. The term "retractable mechanism" includes any mechanism for retracting a cord and permitting extension of at least part of it.

An ear piece 36 is attached to cord 34 that can be extended from and retracted into housing 40. Cord 34, and other cords identified below, can be of any length. For example, it may be long enough to permit the user to clip the mobile phone to a belt while using the ear piece. The cords can be made of varying lengths for different devices.

Ear piece 36 contains a speaker and possibly a microphone. An example of an ear piece having both a speaker and a microphone is described in U.S. Pat. No. 5,363,444, which is incorporated herein by reference. The ear piece need not contain a microphone since an external microphone may be used such as a separate microphone attached to the cord. Also, certain wireless devices, such as an MP3 player or a personal stereo, may only generate sound and thus have no requirement or capability for receiving sound. Ear pieces can include both devices to be inserted into a user's ear, such as an ear plug with a speaker, or devices to be placed against or proximate a user's ear, such as headsets or similar devices. Also, an ear piece can be either directly connected to the cord or attached to it through a detachable clip that permits a user to connect different types of ear pieces to the cord.

A cord connector 35, such as a phone-type plug, is attached to housing 40, or a length of cord, and is electrically connected to cord 34, for example, within the housing. Cord connector 35 can be inserted into device connector 20 on mobile phone 10. The type of cord connector may depend upon the type of phone or device connector within the mobile phone or other wireless device. Although a phone-type plug is shown for connecting with a connector for illustrative purposes, other connectors can be used. The term "cord connector" includes any type of removable connector for providing electrical communication. The term "device connector" includes any type of connector for receiving a cord connector for providing electrical communication.

When in use, cord connector 35 is inserted into device connector 20, and housing 40 can rest against the top 11 of mobile phone 10 in this exemplary embodiment. A user can extend cord 34 by grasping ear piece 36, or a section of the cord, and pulling it out of housing 40. A stop mechanism in housing 40 can hold the cord at particular extended positions so that it is not under tension from the spring-loaded spool or other retractable mechanism. Once held in position, the user can extend cord 34 slightly by pulling on it in order to release the stop mechanism, in one exemplary implementation, and permit the spring-loaded spool or other retractable mechanism to retract cord 34 into housing 40.

The term "stop mechanism" includes any mechanism for releasably holding a cord at least at one particular extended position. Examples of stop mechanisms include mechanisms that hold and release the cord through force applied to the cord itself or through other devices such as a release button external to the housing and attached to a mechanism internal to the housing to hold the cord in place. Manipulation of the release button, in that example, activates and releases the stop mechanism.

An aperture in housing 40 can be large enough to permit passage of cord 34 and small enough to not permit passage of ear piece 36. Therefore, when retracted, ear piece 36 rests against housing 40. Alternatively, cord 34 can include a stopper 33, such as a rubber or plastic washer, on cord 34 and proximate ear piece 36 in order extend ear piece 36 a certain amount when the cord is fully retracted. Stopper 33 may make it easier for a user to grasp and extend the cord by holding the stopper and may also help protect the ear piece by allowing the user to extend the cord without grasping the ear piece. Stopper 33, and others identified below, can be located at any particular distance from the ear piece on the cord and can possibly be adjustable by permitting a user to slide the stopper along the cord.

Figure 4:
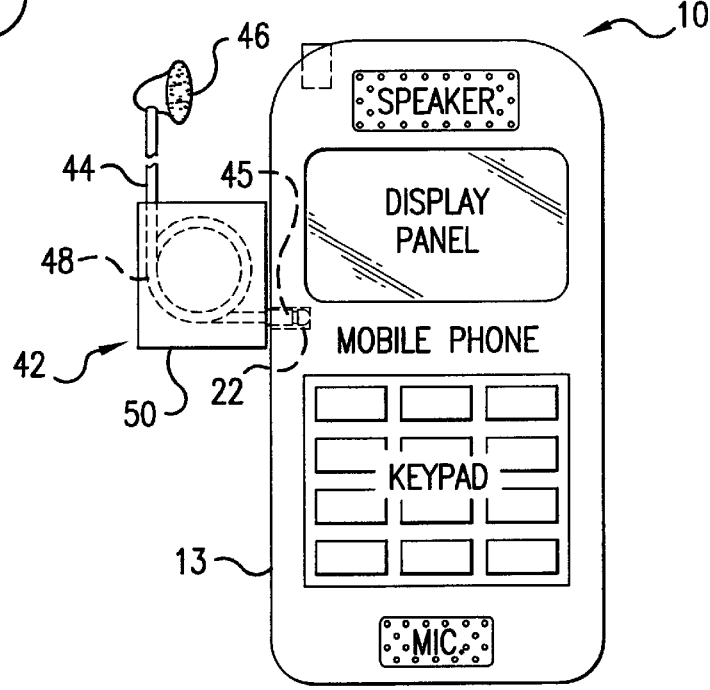
FIG. 4 is a diagram illustrating a separate retractable cord unit for a mobile phone in a second configuration.

FIG. 4 is a diagram illustrating a separate retractable cord unit 42 for mobile phone 10 in a second configuration for use with cord connector 45 on the side 13 in this exemplary embodiment. Unit 42 includes a housing 50 containing a retractable mechanism, in this example a spring-loaded spool as represented by coil 48. It can also contain a stop mechanism. A cord 44 is attached to an ear piece 46 and can extend from and retract into housing 50. Unit 42 otherwise can have the same configuration and operation as unit 32 described above.

Alternatively, one retractable cord unit can have multiple connectors such as both connectors 35 and 45 for use with mobile phones or other wireless devices having connectors in different locations.

Figure 5:
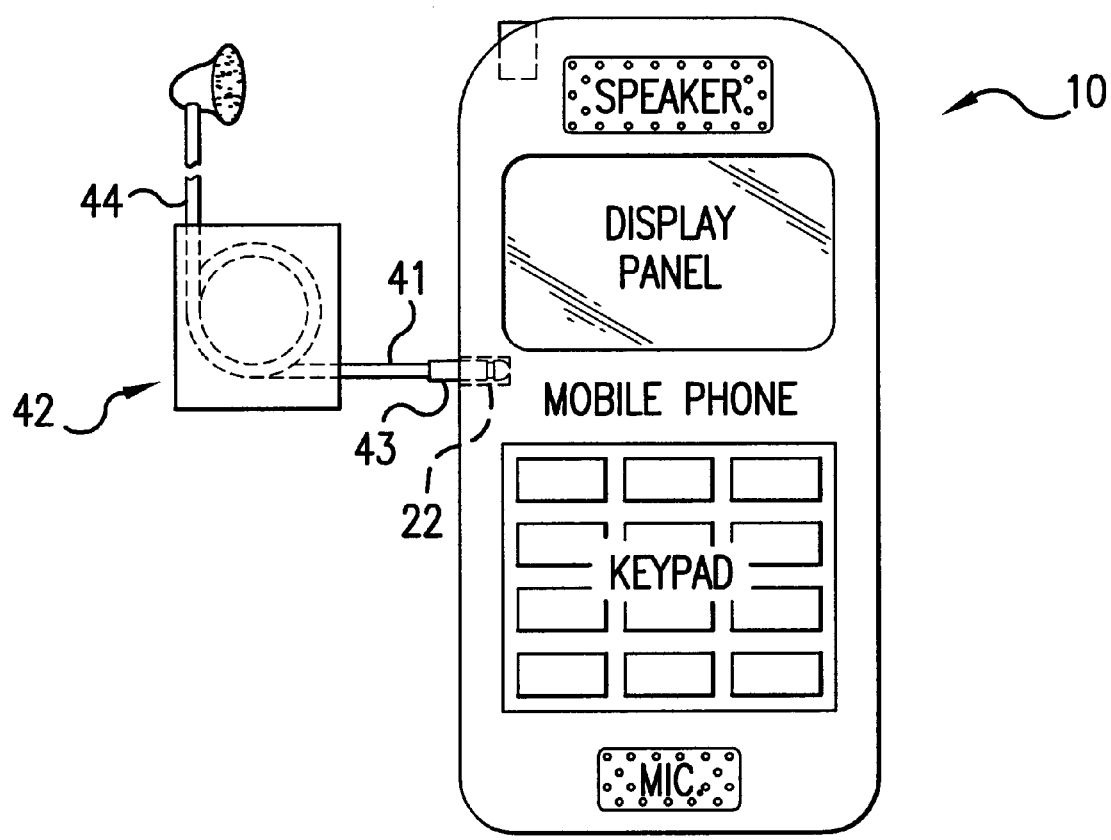
FIG. 5 is a diagram illustrating a separate retractable cord unit for a mobile phone and further illustrating an alternative way to connect the cord unit to the mobile phone.

As another alternative, FIG. 5 is a diagram illustrating unit 42 for mobile phone 10 and further illustrating an alternative way to connect unit 42 to device connector 22. In particular, unit 42 can include a section of cord 41 attached to both unit 42 and a cord connector 43 for use providing electrical communication with connector 22. Instead of attaching to unit 42, section of cord 41 can include a retractable cord connected to the retractable mechanism and thus also attached to cord 44. Therefore, the cord can be retractable on both ends, the end with the ear piece and the end for connection with the mobile phone. Use of a section of cord or retractable cord for the cord connector can involve attachment to any side of the housing, and the alternative is shown with respect to one particular side in FIG. 5 for exemplary purposes only.

Accordingly, attachment of a cord connector to the housing for the separate retractable unit can include, for example, attaching the cord connector to housing, attaching it to the housing via a section of cord, or attaching it to the housing via a retractable cord.

Internal Retractable Cord

Figure 6:
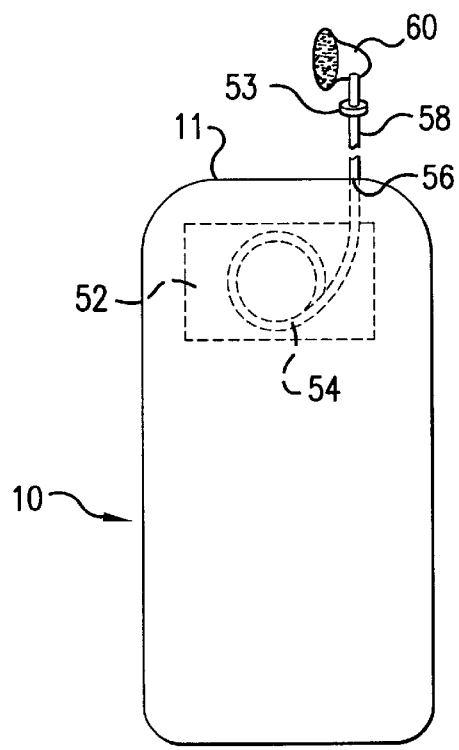
FIG. 6 is a diagram illustrating, in a rear view, an internal retractable cord for a mobile phone in a first configuration.
Figure 7:
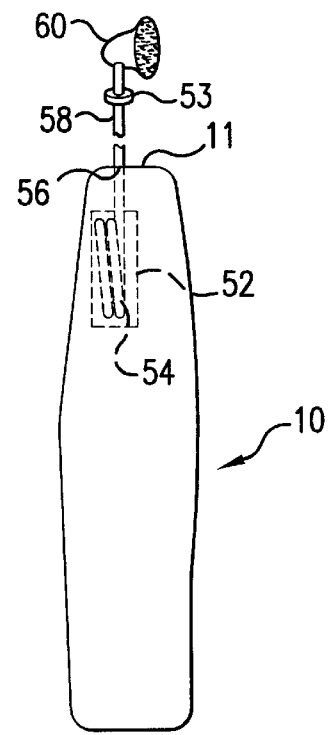
FIG. 7 is a diagram illustrating, in a side view, an internal retractable cord for the mobile phone shown in FIG. 6.

FIGS. 6 and 7 are diagrams illustrating, in a rear and side views, an internal retractable cord for mobile phone 10 in a first configuration. Instead of containing the retractable cord in a separate housing, as explained above, it can be contained within the mobile phone. Conventional mobile phone 10 can be modified to include such a retractable cord.

As shown in FIGS. 6 and 7, mobile phone 10 includes for this modification a compartment 52 containing a retractable mechanism, in this example a spring-loaded spool as represented by coil 54. Compartment 52 can also contain a stop mechanism. A cord 58 is attached to an ear piece 60 for extending from and retracting into mobile phone 10 through an aperture 56. Aperture 56 is preferably large enough to permit passage of cord 58 and small enough to prevent passage of ear piece 60. When retracted and not in use, ear piece 60 rests, for example, against the top 11 of mobile phone 10 or can rest in a prefabricated cradle built into mobile phone 10. The cradle can include a shape configured, for example, to mate with at least a portion of the ear piece such that the mated portion of the ear piece lies substantially flush with the mobile phone. Alternatively, cord 58 can include a stopper 53, such as a rubber or plastic washer, on cord 58 and proximate ear piece 60 in order extend ear piece 60 a certain amount when the cord is fully retracted, which may provide the advantages identified above with respect to stopper 33.

Figure 8:
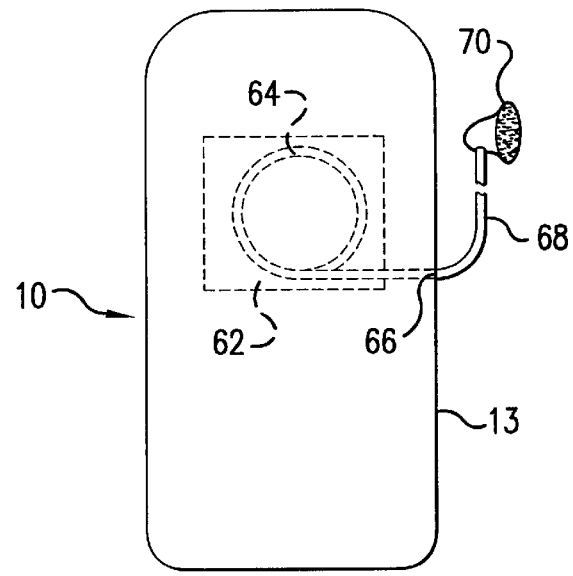
FIG. 8 is a diagram illustrating, in a rear view, an internal retractable cord for a mobile phone in a second configuration.
Figure 9:
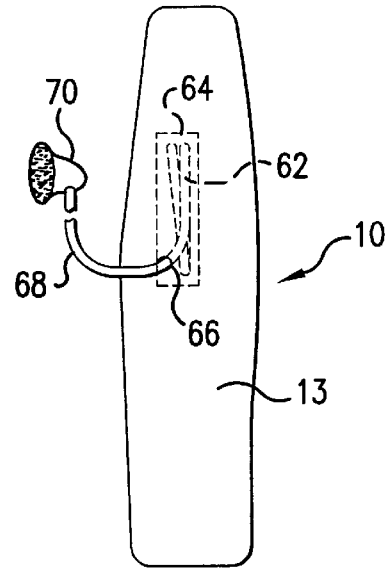
FIG. 9 is a diagram illustrating, in a side view, an internal retractable cord for the mobile phone shown in FIG. 8.

FIGS. 8 and 9 illustrate in rear and side views a modification of mobile phone 10 for locating the cord on the side 13. For this modification, mobile phone 10 includes a compartment 62 containing a retractable mechanism, in this example a spring-loaded spool as represented by coil 64. Compartment 62 can also contain a stop mechanism. A cord 68 is attached to an ear piece 70 for extending from and retracting into mobile phone 10 through an aperture 66. Aperture 66 is preferably large enough to permit passage of cord 68 and small enough to prevent passage of ear piece 70. When retracted and not in use, ear piece 70 rests, for example, against the top 13 of mobile phone 10 or can rest in a cradle built into the phone. This configuration can alternatively include a stopper on cord 68 similar to stopper 53.

Any of the embodiments shown in FIGS. 6–9 can include any of the exemplary ear pieces identified above. They can also include a clip on the cord to attach different types of ear pieces for use with the mobile phone.

Retractable Mechanism and Stop Mechanism

Figure 10:
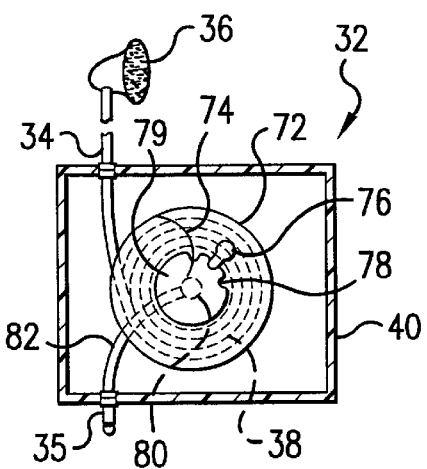
FIG. 10 is a top sectional view of a retractable mobile phone cord unit in a first configuration.
Figure 11:
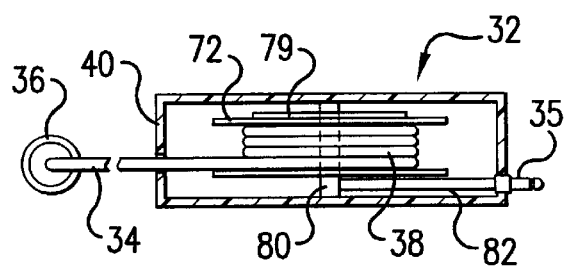
FIG. 11 is a side sectional view of a retractable mobile phone cord unit for the first configuration shown in FIG. 10.

FIGS. 10 and 11 are top and side sectional views of a retractable cord unit 32 shown in FIG. 3 illustrating the operation of an exemplary retractable mechanism and a stop mechanism. Housing 40 contains a spool 72 mounted on a pin 80 for rotation. A coil spring 74 applies tension to spool 72 for retracting and winding cord 34 onto spool 72, as shown by coil 38 for this example. A section 82 of the cord is attached to cord connector 35 and internally attached to coil 38 for providing an electrical connection between cord connector 35 and cord 34.

The stop mechanism in this example includes a pivotally mounted pawl 76 cooperating with a plate 79 rotationally connected with spool 72 on pin 80. Pawl 76 can stop rotation of spool 72 by contacting a dimple such as dimple 78 on plate 79, thus holding a extended position of cord 34. Slightly extending cord 34 when held by the stop mechanism releases pawl 76, permitting spool 72 to retract cord 34. Stop mechanisms can also include, for example, an external release button as described above.

Figure 12:
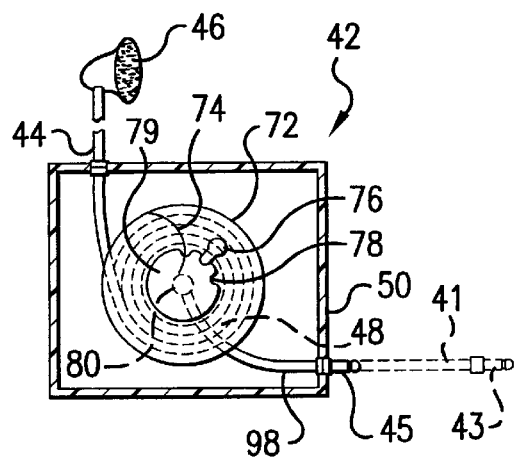
FIG. 12 is a top sectional view of a retractable mobile phone cord unit in a second configuration.
Figure 13:
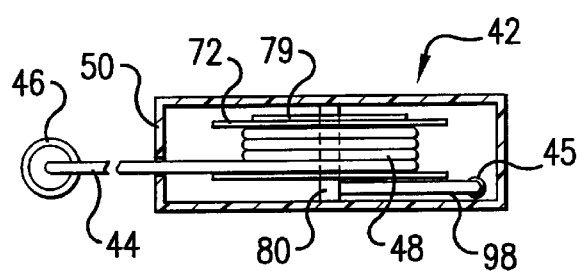
FIG. 13 is a side sectional view of a retractable mobile phone cord unit for the second configuration shown in FIG. 12.

FIGS. 12 and 13 are top and side sectional views of a retractable cord unit 42 shown in FIG. 4 illustrating the operation of an exemplary retractable mechanism and stop mechanism for this embodiment. As shown, housing 50 can include the same internal components as housing 40 except that it has a section 98 of cord 44 attached to cord connector 45 and to coil 48 for providing electrical connection between cord connector 45 and cord 44. In this embodiment, the cord connector is contained on a side perpendicular to a side from which the cord extends, rather than on an opposite side for unit 32. Otherwise, unit 42 can internally function the same as unit 32. FIG. 12 also illustrates the alternative use of a section of cord 41, possibly retractable, for attaching cord connector 43 to housing 50.

The embodiments for a retractable cord internal to mobile phone 10, as shown in FIGS. 6–9, or other wireless device can use the same retractable mechanism and stop mechanism as shown within housings 40 and 50 except that those components are mounted within the mobile phone or other wireless device. Also, since the cord is within the mobile phone in those embodiments, the cord can be internally connected directly to the mobile phone circuitry. The internal components can include a switch connected to the spring-loaded spool or other retractable mechanism. Extending the cord can engage or trigger the switch in order to de-activate the conventional speaker and microphone in mobile phone 10 and activate the ear piece and possibly a microphone on the cord. Alternatively, mobile phone 10 can have programming such that a user-entered command via key pad 16 activates and deactivates use of the cord and the conventional device speaker and microphone.

The retractable mechanism and stop mechanism in the embodiments described above can be implemented, for example, with mechanisms known in the art. Examples of retractable cords and stop mechanisms are described in the following patents, all of which are incorporated herein by reference: U.S. Pat. Nos. 6,088,021; 6,065,080; 6,019,304; and 5,094,396. Furthermore, as illustrated in, for example, U.S. Pat. Nos. 6,088,021 and 6,065,080, retractable mechanisms with stop mechanisms can have a small form factor and thus need not significantly increase the size of the mobile phone or other wireless device and, likewise, can be implemented in a small separate housing. It can be implemented of any particular size; however, using a small form factor may provide that advantage and, when implemented in a separate housing, may be more easily carried and stored in containers such as a purse or briefcase.

In addition to mobile phones, the retractable cord can be implemented within a housing for use with other wireless devices or actually within other wireless devices. Examples of other wireless devices, in addition to mobile phones, include the following: personal digital assistants (PDAs); Internet appliances; MP3 players; and personal stereos such as Walkman products. The separate retractable cord unit, or internal retractable cord, can be configured and operate the same as those embodiments described above.

For any of the embodiments implemented with as a separate unit, the housing for the unit can have any shape. A square shape is shown for illustrative purposed only. It can also be implemented with, for example, a shape having a combination of curved surfaces, a shape having a combination of planar surfaces, a shape having a combination of curved and planar surfaces, or an irregular shape. Also, the shape may depend upon, for example, the shape or configuration of the mobile phone or other wireless device for its intended use. In particular, the housing can be made of various shapes in order to mate with various types of mobile phones or other wireless devices.

In addition, the exterior of the housing can have various colors, logos, patterns, monograms, or text. For example, it can have advertisements, or it can be personalized to include a user's name or initials. It can be made of any type of material such as, for example, a molded plastic or a metal material.

While the present invention has been described in connection with an exemplary embodiment, it will be understood that many modifications will be readily apparent to those skilled in the art, and this application is intended to cover any adaptations or variations thereof. For example, various shapes and configurations for the separate retractable cord unit, and various types of retractable and stop mechanisms, may be used without departing from the scope of the invention. This invention should be limited only by the claims and equivalents thereof.

What is claimed is:

1. A mobile phone having a retractable cord, comprising:
   a mobile phone contained within a housing, the mobile phone having an internal microphone contained within the housing and an internal speaker contained within the housing;
   a retractable mechanism in the mobile phone and containing a cord capable of transmitting an electrical signal, the retractable mechanism operating to permit extension of the cord from the mobile phone through an aperture and retract at least a portion of the cord into the mobile phone through the aperture, wherein the cord is operable independent from an antenna in the mobile phone, and wherein the retractable mechanism is contained within the housing and not within a separate housing detachable from the housing; and an ear piece attached to the cord extending from the aperture, wherein the ear piece is electrically connected with the mobile phone via the cord, the ear piece including a speaker and having an associated external microphone, wherein a user can selectively receive an output of the mobile phone from the internal speaker and from the ear piece, and wherein the user can selectively provide an input to the mobile phone via the internal microphone and via the microphone associated with the ear piece.

2. The mobile phone of claim 1, wherein the retractable mechanism includes a spring-loaded spool.

3. The mobile phone of claim 1, further including a stop mechanism in the mobile phone and operatively connected to the retractable mechanism for holding the cord when extracted from the housing at selected positions.

4. The mobile phone of claim 1, wherein the ear piece includes at least one of the following: an ear plug to be inserted into a user's ear or a headset to placed against or proximate the users ear.

5. The mobile phone of claim 1, further including a stopper on the cord to prevent retraction of a portion of the cord through the aperture.

6. The mobile phone of claim 1 wherein the cord is retractable through the aperture in a top of the mobile phone.

7. The mobile phone of claim 1 wherein the cord is retractable through the aperture in a side of the mobile phone.

8. A wireless device having a retractable cord, comprising:

a wireless device contained within a housing and capable of receiving and processing wireless signals to provide an output, the wireless device having an internal speaker contained within the housing;

a retractable mechanism in the wireless device and containing a cord capable of transmitting an electrical signal, to retractable mechanism operating to permit extension of the cord from the wireless device through an aperture and retract at least a portion of the cord into the wireless device through the aperture, wherein the cord is operable independent from an antenna in the wireless device, and wherein the retractable mechanism is contained within the housing and not within a separate housing detachable from the housing; and an ear piece attached to the cord extending from the aperture, wherein the ear piece includes a speaker capable of providing the output and is electrically connected with the wireless device via the cord, wherein a user can selectively receive the output of the wireless device from the internal speaker and from the ear piece.

9. The wireless device of claim 8 wherein the retractable mechanism includes a spring-loaded spool.

10. The wireless device of claim 8, further including a stop mechanism in the wireless device and operatively connected to the retractable mechanism for holding the cord when extracted from the housing at selected positions.

11. The wireless device of claim 8 wherein the ear piece includes at least one of the following: an ear plug to be inserted into a user's ear; or a headset to placed against or proximate the user's car.

12. The wireless device of claim 8 wherein the ear piece includes a speaker and a microphone.

13. The wireless device of claim 8, further including a stopper on the cord to prevent retraction of a portion of the cord through the aperture.

14. The wireless device of claim 8 wherein the wireless device comprises one of the following: a personal digital assistant; an Internet appliance; an MP3 player; or a personal stereo.

\* \* \* \* \*